(12) United States Patent
Kochi et al.

(10) Patent No.: US 6,611,664 B2
(45) Date of Patent: Aug. 26, 2003

(54) STEREO IMAGE PHOTOGRAPHING SYSTEM

(75) Inventors: Nobuo Kochi, Tokyo (JP); Mituharu Yamada, Tokyo (JP); Hitoshi Otani, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/887,267

(22) Filed: Jun. 25, 2001

(65) Prior Publication Data

US 2001/0055484 A1 Dec. 27, 2001

(30) Foreign Application Priority Data

Jun. 26, 2000 (JP) ..................... 2000-190506
Jun. 26, 2000 (JP) ..................... 2000-190513
Jun. 26, 2000 (JP) ..................... 2000-190580

(51) Int. Cl.[7] .............................................. G03B 35/00
(52) U.S. Cl. ...................... 396/324; 396/431; 348/50
(58) Field of Search ................... 396/324, 431, 396/322, 323, 326; 356/603, 611, 613, 627; 348/42, 50

(56) References Cited

U.S. PATENT DOCUMENTS 5,424,836 A * 6/1995 Weise et al. ............ 250/559.19
6,043,891 A * 3/2000 Hartrumpf et al. ......... 356/603

* cited by examiner

Primary Examiner—Russell Adams
Assistant Examiner—Arthur A Smith

(57) ABSTRACT

The present invention provides a stereo image photographing system capable of easily obtaining a stable, highly reliable and accurate stereo image when three-dimensional measurement is carried out by a general camera. A photographing unit includes a camera and an omni-directional prism. By collimating the prism on the photographing unit, a measuring unit measures position data thereof (measured value). A photographing position calculating unit calculates a proper photographing position based on a photographing condition set by a condition setting unit. To realize coincidence or rough coincidence between the data of the position (measured value) of the photographing unit measured by the measuring unit and the data of the photographing position calculated by the photographing position calculating unit, a photographing control unit allows a movement control unit and a driving unit to move the photographing unit, and outputs a timing signal for photographing to the photographing unit and the measuring unit. Based on the timing signal, an image data storing unit stores image data and the position data. A signal processing unit performs three-dimensional measurement and analysis based on the image data and the position data.

33 Claims, 19 Drawing Sheets

(A)

(B)

(A)

(B)

(C)

(A)

(B)

STEREO IMAGE PHOTOGRAPHING SYSTEM

BACKGROUND OF THE INVENTION

The present invention relates to a stereo image photographing system, and more particularly to one capable of easily obtaining information and measuring data necessary for obtaining three-dimensional data from a stereo image.

In recent years, line drawing has been made for a site to be measured by using a surveying instrument, e.g., a pen-based mapping system, and a portable computer in combination thereof. In such a conventional pen-based mapping system, plotting has been carried out by drawing a line image on the portable computer, using a surveying instrument such as a total station and a GPS. The plotting of the site to be measured was carried out on site by watching the situation there, or in an office based on photographed images. In aerial photography, plotting was carried out by using an analytical plotting device or the like based on stereo-photographed images. When three-dimensional measurement was carried out from a stereo image in a terrestrial photogrammetry, conventionally, photographing, analysis and measurement were executed by a stereo-camera having a base line length and the facing direction of the camera strictly fixed.

SUMMARY OF THE INVENTION

However, in the conventional art, the fixing of the base line length or the like of the stereo-camera has placed limitations on the range of photographing and accuracy (object). In addition, conventionally, when measurement was carried out without fixing the base line length or the like, even if two images were overlapped and photographed for three-dimensional analysis by stereo-photographing, it was difficult to form an image to be subjected to stereo-analysis. In other words, in most cases, the analysis of images was impossible, and even if possible, the images were unstable with low accuracy and considerably low reliability. In particular, when photographing was carried out with a camera loaded on a balloon, a car, or other moving body, it was extremely difficult to obtain a highly reliable and analyzable image.

The present invention was made with the foregoing problems in mind, and it is an object of the invention to easily obtain a stable, highly reliable and accurate stereo image when three-dimensional measurement is carried out by a general camera. It is another object of the invention to provide a stereo image photographing system which makes it easy and reliable to perform stereo-photographing for three-dimensional measurement, which has been difficult, and further enable automatic stereo-photographing.

In accordance with a first aspect of the present invention, a stereo image photographing system is provided, comprising:
  a photographing unit which is movable and has a camera for photographing and a reflection member placed thereon;
  a signal generating unit for generating a timing signal indicating a photographing timing when photographing is made by the camera of the photographing unit; and
  a measuring unit placed in a position apart from the photographing unit, for emitting a measuring light toward the reflection member of the photographing unit in accordance with the timing signal from the signal generating unit, and measuring a position of the photographing unit based on a reflected light reflected from the reflection member.

In accordance with a second aspect of the present invention, a stereo image photographing system is provided, comprising:
  a photographing unit which is movable and has a camera for photographing an image of an object in accordance with a timing signal indicating a timing and a reflection member placed thereon;
  a measuring unit placed in a position apart from the photographing unit, for emitting a measuring light toward the reflection member of the photographing unit, and measuring a position of the photographing unit based on a reflected light reflected from the reflection member;
  a photographing position calculating unit for calculating photographing position data based on photographing condition data regarding the object to be photographed;
  a driving unit for moving the photographing unit to a predetermined position based on the photographing position data calculated by the photographing position calculating unit;
  a movement control unit for controlling the driving unit; and
  a photographing control unit for outputting a timing signal to the camera of the photographing unit when coincidence/rough coincidence is determined between position data regarding the position of the photographing unit measured by the measuring unit and the photographing position data calculated by the photographing position calculating unit.

In accordance with a third aspect of the invention, a stereo image photographing system is provided, comprising:
  a photographing unit which is movable and has a camera for photographing and a reflection member placed thereon;
  a photographing position calculating unit for calculating photographing position data based on photographing condition data regarding an object to be photographed;
  a driving unit for moving the photographing unit to a predetermined position based on the photographing position data calculated by the photographing position calculating unit;
  a movement control unit for controlling the driving unit; and
  a storing unit for storing data of an image photographed by the camera of the photographing unit.

DETAILED DESCRIPTION OF THE PREFERRED EMBODIMENTS

Now, the preferred embodiments of the present invention will be described.

1. Automatic Photographing

Figure 1:
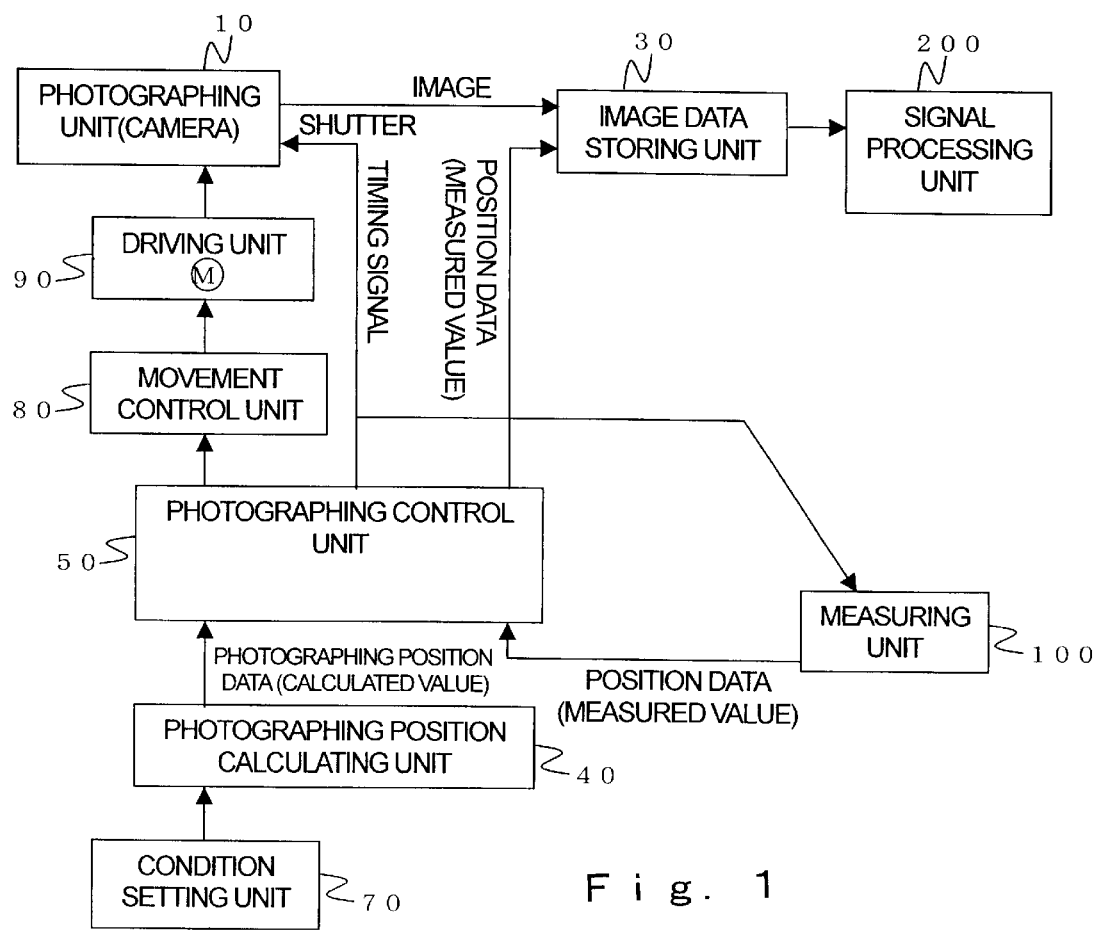
FIG. 1 is an entire configuration view of automatic measurement.

FIG. 1 is a configuration view showing a stereo image photographing system according to a first embodiment. In the embodiment, the stereo image photographing system comprises: a photographing unit 10; an image data storing unit 30; a signal processing unit 200; a measuring unit 100; a condition setting unit 70; a photographing position calculating unit 40; a photographing control unit 50; a movement control unit 80; and a driving unit 90.

The photographing unit 10 includes a camera for photographing an image and an omni-directional prism. The image data storing unit 30 stores the data of an image photographed by the camera of the photographing unit 10 and the data of a position measured by the measuring unit 100 in correlation with each other. The signal processing unit 200 performs three-dimensional measurement and analysis based on the data of stereo-photographed image and the position data. For the measuring unit 100, a total station or the like as a survey instrument is used. The measuring unit 100 measures the position data thereof (measured value) by collimating a prism on the photographing unit 10. Here, automatic measurement is executed by utilizing auto-tracking total station. The condition setting unit 70 sets photographing conditions including a photographing range, accuracy, a camera standardized value and the like. The photographing position calculating unit 40 calculates a proper photographing position based on the photographing range, the necessary accuracy and the photographing conditions of the camera/lens set by the condition setting unit 70. In addition, based on the result of preliminary measurement made by the measuring unit 100, the photographing position calculating unit 40 calculates and decides a photographing scheduled position. The photographing control unit 50 allows the movement control unit 80 and the driving unit 90 to move the photographing unit 10 in order to bring the position data (measured value) indicating the position of the photographing unit 10 measured by the measuring unit 100 into coincidence or rough coincidence with the photographing position data calculated by the photographing position calculating unit 40. Then, when coincidence or rough coincidence is set between the measured position data and the calculated photographing position data, the photographing control unit 50 outputs a timing signal for photographing to the photographing unit 10 and the measuring unit 100. In addition, the photographing control unit 50 sends the position data (measured value) at the photographing timing to the image data storing unit 30. At this time, the photographed image data sent from the photographing unit 10 is stored in the image data storing unit 30. The movement control unit 80 supplies the moving amount of the photographing unit 10 to the driving unit 90. The driving unit 90 enables the photographing unit 10 to move.

Figure 2:
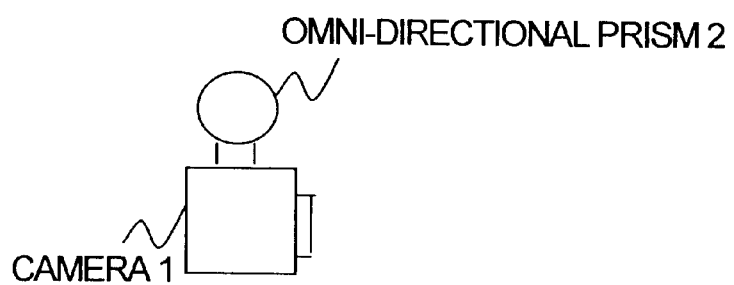
FIG. 2 is a constitutional view of a photographing unit.

FIG. 2 is a constitutional view of the photographing unit 10. For a camera 1, a commercial film camera, a digital camera, a metric camera or the like is used. An omni-directional prism 2 includes a number of prisms attached in respective directions such that the measuring unit 100 in any direction measures the position of the omni-directional prism 2. Further, the photographing unit 10 has been set movable by the driving unit 90.

FIGS. 3A and 3B are constitutional views of the driving unit. For example, the driving unit 90 can be attached to a car, an earthmover or the like as shown in FIG. 3A, or a moving body such as a balloon as shown in FIG. 3B to constitute a platform. Further, a photographing attitude position correcting unit, as described later, may be provided in the camera 1 of the photographing unit 10 to cumulatively calculate acceleration or angular velocity obtained by using a gyro sensor or a tilt sensor used therein.

At least the photographing unit 10 is mounted on the platform for photographing, and the image data storing unit 30, the signal processing unit 200 and the like, can also be mounted as occasion demands. Between the platform and the measuring unit 100, by using a transmitter/receiver provided in each thereof, each signal of position data for a measuring instruction, measured data and the like is transferred. The transmitter/receiver is attached to the photographing unit 10, the image data storing unit 30 or other proper position. The transmitter/receiver can use, in addition to a transmission system by optical communications using an optical transmitter/receiver, a proper radio or wire transmission system.

With regard to component mounting, as an example, when a component other than the measuring unit 100 is mounted on the platform, between the platform and the measuring unit 100, a timing signal and the measured position data are transferred by the transmitter/receiver. As another example, the photographing unit 10, the driving unit 90, the movement control unit 80, the image data storing unit 30, and the signal processing unit 200 may be mounted on the platform, and the photographing control unit 50, the photographing position calculating unit 40 and the condition setting unit 70 may be mounted on the measuring unit 100 side. In this case, between the platform and the measuring unit side, the timing signal, the measured position data and the control signal of the movement control unit 80 are transferred by the transmitter/receiver. As yet another example, proper components may be mounted to form a block other than the platform and the measuring unit 100 side. In this case, for example, the photographing unit 10, the driving unit 90, the movement control unit 80 can be mounted on the platform, while the photographing control unit 50, the photographing position calculating unit 40, the condition setting unit 70, the image data storing unit 30 and the signal processing unit 200 can be mounted on this other block.

Figure 4:
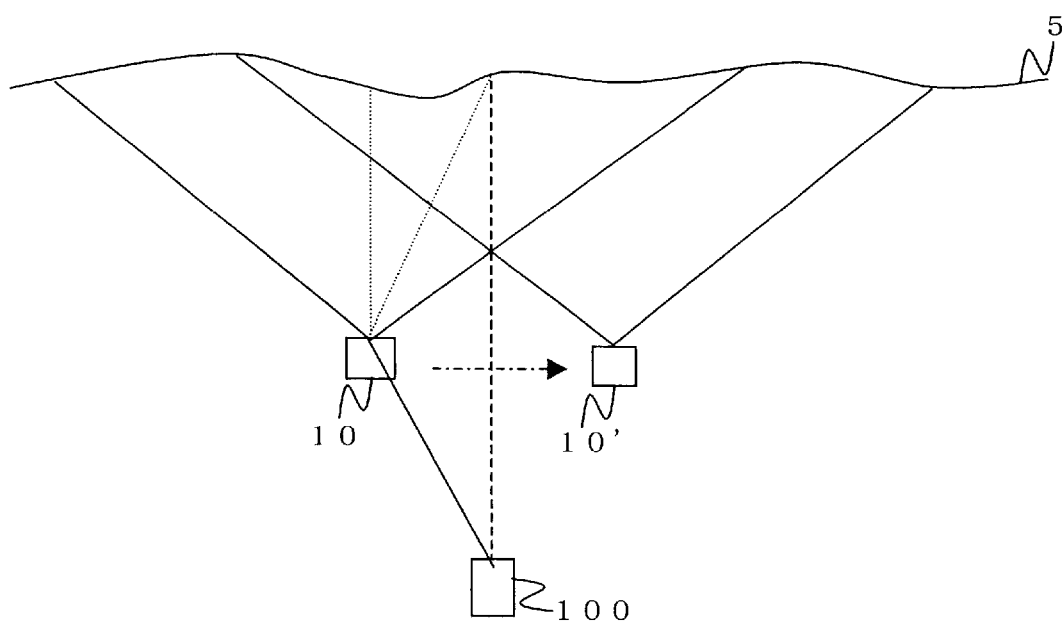
FIG. 4 is a view illustrating a situation of measurement.

FIG. 4 is a view illustrating a situation of measurement. As shown in the drawing, the photographing unit 10 performs photographing at least at two places or more to execute stereo-photographing. Then, by using the omni-directional prism mounted on the photographing unit 10, each photographing position is measured by the survey instrument of the measuring unit 100. In addition, if at least one or more reference points are set in an object to be measured, positions with respect to the object of camera 1, the photographing unit 10 and the measuring unit 100 can be accurately measured.

Figure 5:
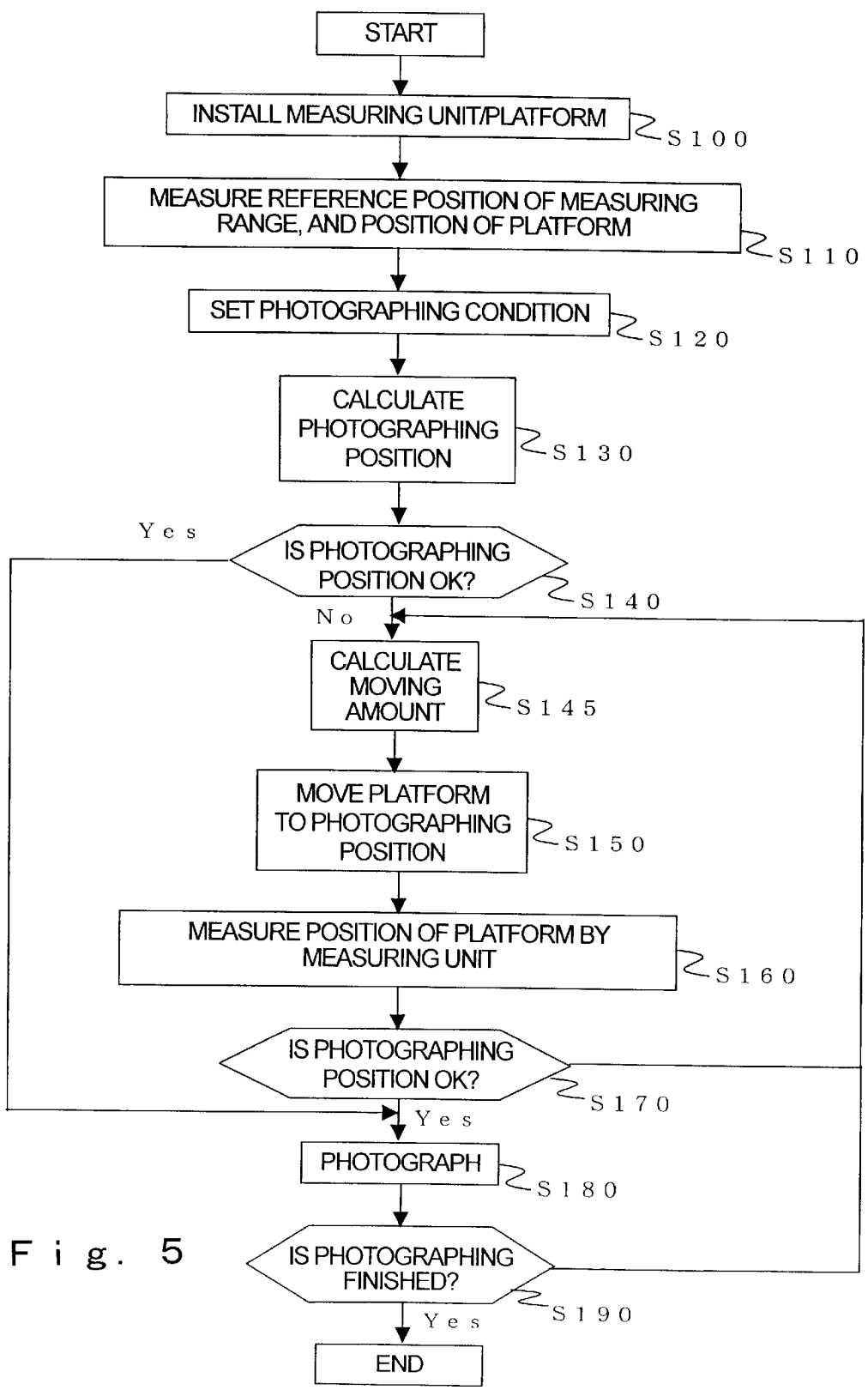
FIG. 5 is a flowchart of automatic measurement.
Figure 6:
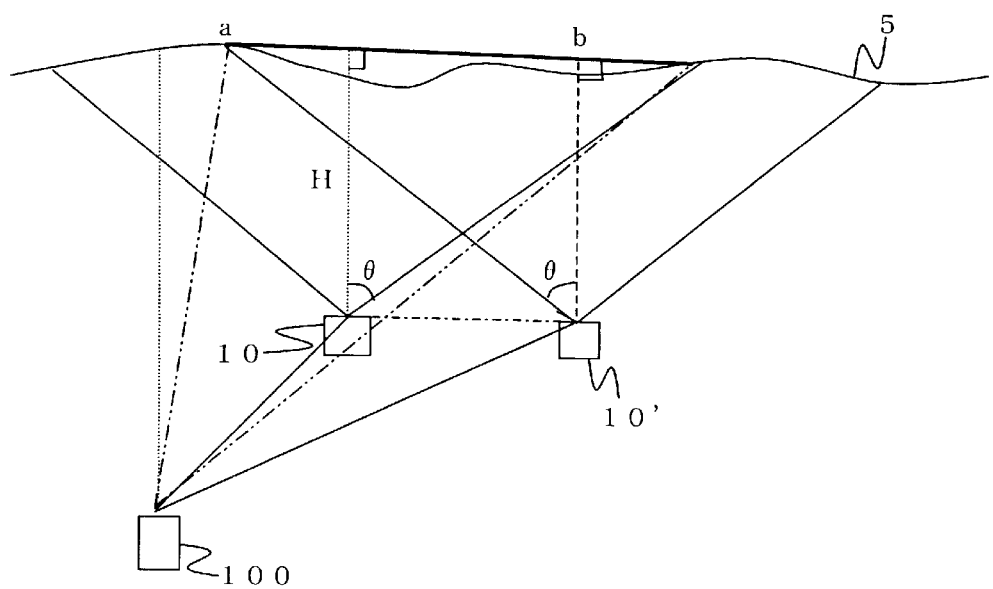
FIG. 6 is a view illustrating a photographing position.

Next, operation of automatic measurement will be described by referring to a flowchart. FIG. 5 is a flowchart of the automatic measurement. FIG. 6 is a view illustrating a photographing position based on the automatic measurement.

First, the measuring unit 100 and the platform (photographing unit 10) are installed (S100). The measuring unit 100 is installed in a position with respect to the object to be measured, where the measuring unit 100 does not interfere with the measurement and the photographing position of the photographing unit 10 can be viewed from the measuring unit 100. For example, the position may be one indicated by the measuring unit 100 shown in FIG. 6. If the measuring unit 100 is placed roughly in a photographing start position, the operation will be more efficient. Then, the measuring range (reference position) of the object to be measured, for example, positions a and b in FIG. 6 are measured by the measuring unit 100 (S110). Further, the position of the omni-directional prism 2 of the photographing unit 10 is measured by the measuring unit 100 (S110). Then, the measuring unit 100 transfers the measured data to the photographing control unit 50. The condition setting unit 70 sets photographing condition data regarding the object to be photographed in the photographing position calculating unit 40 (S120). The data to be set here includes a lens angle of view θ, a focal distance f, a pixel pitch δp of the digital camera, planar direction necessary accuracy δxy, depth direction necessary accuracy δz and so on. The photographing position calculating unit 40 calculates photographing position data based on such conditions (S130). Now, the calculation of the photographing position data is described. For simplicity, it is assumed that the digital camera is positioned facing to the object to be measured. In the photographing position calculating unit 40, a photographing position is calculated based on the pixel size δp of the digital camera attached to the photographing unit 10, the focal distance f and the angle of view θ of the lens and the necessary accuracy, which are set in step S120.

For example, if the planar direction necessary accuracy of the object to be measured is δxy, a photographing distance H is as follows:

$$H = \delta xy \times f/\delta p \quad (1)$$

If the depth direction necessary accuracy is δz, a base line length B is as follows:

$$B = H \times H \times \delta p/(f \times \delta z) \quad (2)$$

A photographing range R is calculated as follows:

$$R = 2H \tan(\theta/2) \quad (3)$$

An overlapping range O is as follows:

$$O = R \cdot B \quad (4)$$

From the above, the number of photographed pieces is as follows:

$$n = \text{area}/O, \text{ and if the remainder} \neq 0, n+1 \quad (5)$$

Thus, a total photographing range is as follows:

if the remainder is=0, total area=$O \times n + 2B$ (6)

if the remainder is≠0, total area=$O \times (n+1) + 2B$ (7)

The measuring range from a to b is all set to be overlapped area, thereby deciding a photographing position. If the remainder≠0, the total photographing range is not limited to the equation (7). The method of obtaining the photographing position is not limited to the foregoing overlapping method. As to steps S120 and S130, if the photographing range is known beforehand, then rough calculation may be made by setting conditions in a step before these steps. In addition, if a lens or a camera is selected based on the necessary accuracy, the condition of a site and the like, an optimal condition may be obtained and decided before work on site.

Now, description will be made by referring again to the flowchart. After the calculation of the photographing position data in step S130, the previously measured position data of the platform (photographing unit 10) is compared with the photographing position data calculated by the photographing position calculating unit 40 by the photographing control unit 50 (S140). If both position data are in coincidence or rough coincidence with each other, a photographing position is determined to be proper (OK), and the process proceeds to step S180. If not OK, the process proceeds to a next step S145. In step S145, the amount of deviation (moving amount) between the measured position data (measured value) of the platform including the photographing unit 10 and the photographing scheduled position calculated by the photographing position calculating unit 40 is calculated by the photographing control unit 50. Then, the photographing control unit 50 sends the moving amount to the movement control unit 80. The movement control unit 80 allows the driving unit 90 to move the photographing unit 10 to the photographing position based on an instruction from the photographing control unit 50 (S150). After the end of the movement, the movement control unit 80 sends a movement end signal to the photographing control unit 50 as occasion demands. Then, the measuring unit 100 measures the position of the platform (photographing unit 10) (S160). The received position data (measured value) of the platform (photographing unit 10) is compared with the photographing position data (calculated value) calculated by the photographing position calculating unit 40 by the photographing control unit 50 (S170). If both position data are in coincidence or rough coincidence with each other, a photographing position is determined to be proper (OK), and the process proceeds to step S180. If not OK, then the process proceeds to step S145. If the photographing position is OK in step S140 or S170, photographing is carried out by the photographing unit 10 (S180). At this time, if the system includes the image data storing unit 30, then the photographing image data and the position data (measured value) are simultaneously written in the image data storing unit 30. Then, if the number of photographed pieces satisfies the condition, the photographing is finished and, if next photographing is necessary, the process proceeds to step S145 (S190). After the end of the photographing, three-dimensional measurement is carried out by the signal processing unit 200. As a result, it is possible to automatically photograph a stereo image.

Figure 7:
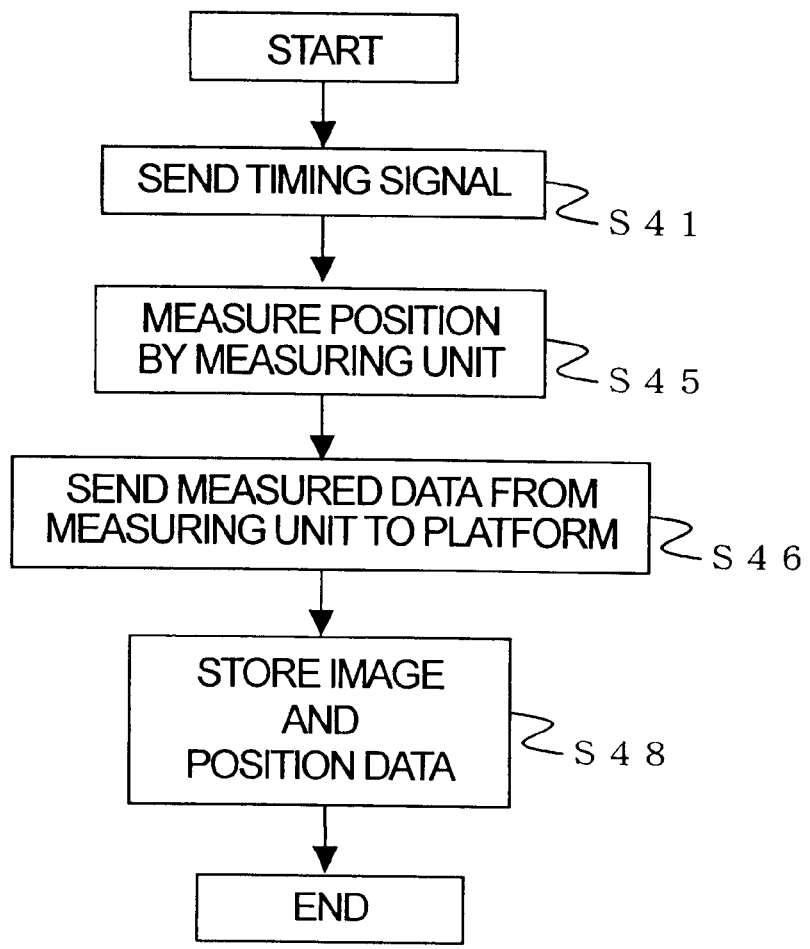
FIG. 7 is a flowchart of position measurement.

FIG. 7 is a flowchart showing in detail the position measurement of the photographing unit 10 carried out in steps S110 and S160 described above with reference to the flowchart of the automatic measurement.

After the movement to the photographing position in steps S100 and S150 of FIG. 5, a timing signal is sent from the platform side to the measuring unit 100 in matching with the photographing timing (S41). Then, the position of the photographing unit 10 is measured by the measuring unit 100 (S45). That is, upon having received a command signal of position measurement, the measuring unit 100 performs position measurement by automatically collimating the omni-directional prism 2 of the photographing unit 10. After the end of the position measurement, the measuring unit 100 sends measured position data to the platform side (S46). The image data storing unit 30 receives the measured position data, correlates the data with the photographed image data, and then stores the same (S48). The foregoing operation can be performed automatically.

Figure 8:
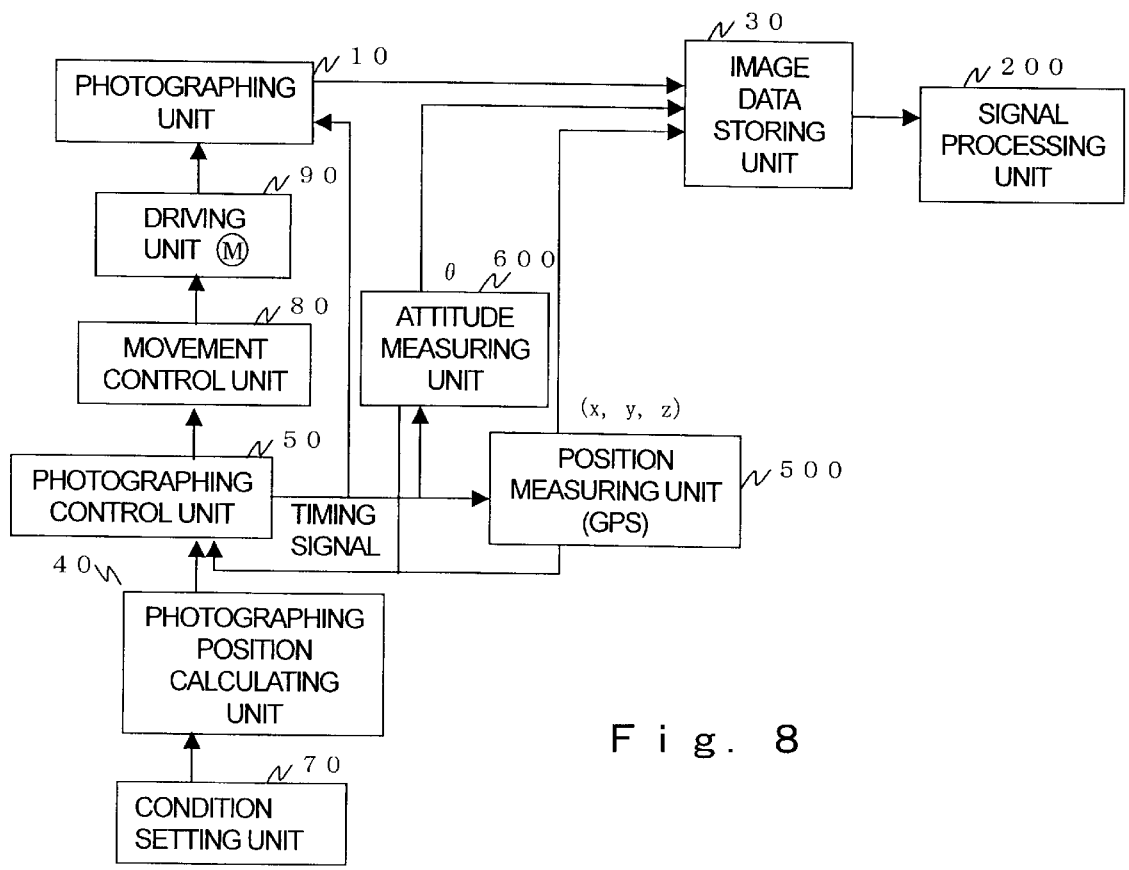
FIG. 8 is an entire configuration view of a moving photographing system.

FIG. 8 is a configuration view of a stereo image photographing system according to a second embodiment. In the second embodiment, the stereo image photographing system comprises: a photographing unit 10; an image data storing unit 30; a condition setting unit 70; a photographing position calculating unit 40; a photographing control unit 50; a movement control unit 80; a driving unit 90; an attitude measuring unit 600; and a position measuring unit 500. The attitude measuring unit 600 is composed of a gyro or the like, and provided to measure the attitude data of the photographing unit 10. The position measuring unit 500 is composed of GPS or the like, and provided to measure the position data of the photographing unit 10. The other components are similar to those shown in FIG. 1 except the measuring unit 100. Thus, even without the assistance of the measuring unit 100, the photographing unit 10 can move to a photographing position to a certain extent.

The operation flowchart of the second embodiment is similar to that of the first embodiment. In this case, however, in accordance with a timing signal for photographing outputted from the photographing control unit 50, position data and attitude data regarding the camera are outputted from the position measuring unit 500 and the attitude measuring unit 600 respectively, and stored in the image data storing unit 30 in correlation with the image data from the photographing unit 10.

2. Manual Photographing

Figure 17:
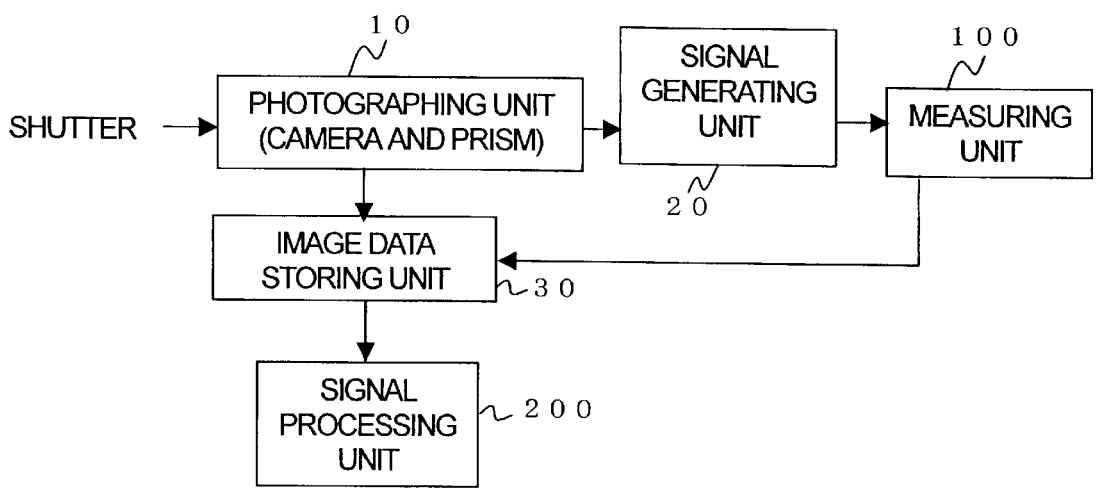
FIG. 17 is a configuration view of a third embodiment for manual measurement.

FIG. 17 is a configuration view of a stereo image photographing system according to a third embodiment. In the embodiment, the stereo image photographing system comprises: a photographing unit 10; a signal generating unit 20; a measuring unit 100; an image data storing unit 30; and a signal processing unit 200.

The photographing unit 10 includes a camera for photographing an image and a prism. Further, the photographing unit 10 can be moved by a driving unit. For the measuring unit 100, a total station or the like as a survey instrument is used. The measuring unit 100 measures position data thereof (measured data) by collimating the omni-directional prism 2 on the photographing unit 10. The signal generating unit 20 outputs a timing signal indicating a position measuring instruction to the measuring unit 100 in accordance with a photographing timing at the photographing unit 10. The image data storing unit 30 stores the data of an image photographed by the camera of the photographing unit 10 and the data of a position measured by the measuring unit 100 in correlation with each other. The signal processing unit 200 performs three-dimensional measurement and analysis based on the stereo-photographed image data and the position data.

For the constitution of the photographing unit 10, refer to FIG. 2 and its description.

Figure 3:
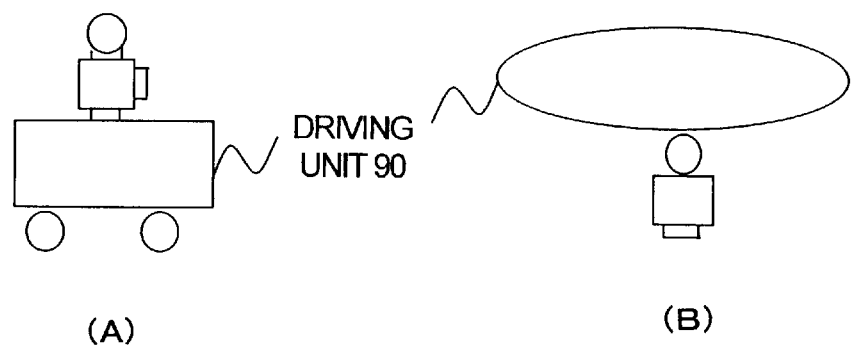
FIGS. 3A and 3B are constitutional views of a driving unit.

Also, for the constitution of the driving unit, refer to FIG. 3 and its description.

At least the photographing unit 10 is mounted on the platform for photographing. Further, the signal generating unit 20, the image data storing unit 30, the signal processing unit 200 and the like, can be mounted on the platform.

Between the signal generating unit 20 and the measuring unit 100, each signal of position data for a measuring instruction, measured data and the like is transferred by a transmitter/receiver provided therein. The transmitter/receiver is attached to the photographing unit 10, the signal generating unit 20, the image data storing unit 30 or other proper positions. The transmitter/receiver can use, in addition to a transmission system by optical communications using an optical transmitter/receiver, a proper radio or wire transmission system.

The mounting example of each component is similar to that of the foregoing embodiments.

For the situation of measurement, refer to FIG. 4 and its description.

Figure 18:
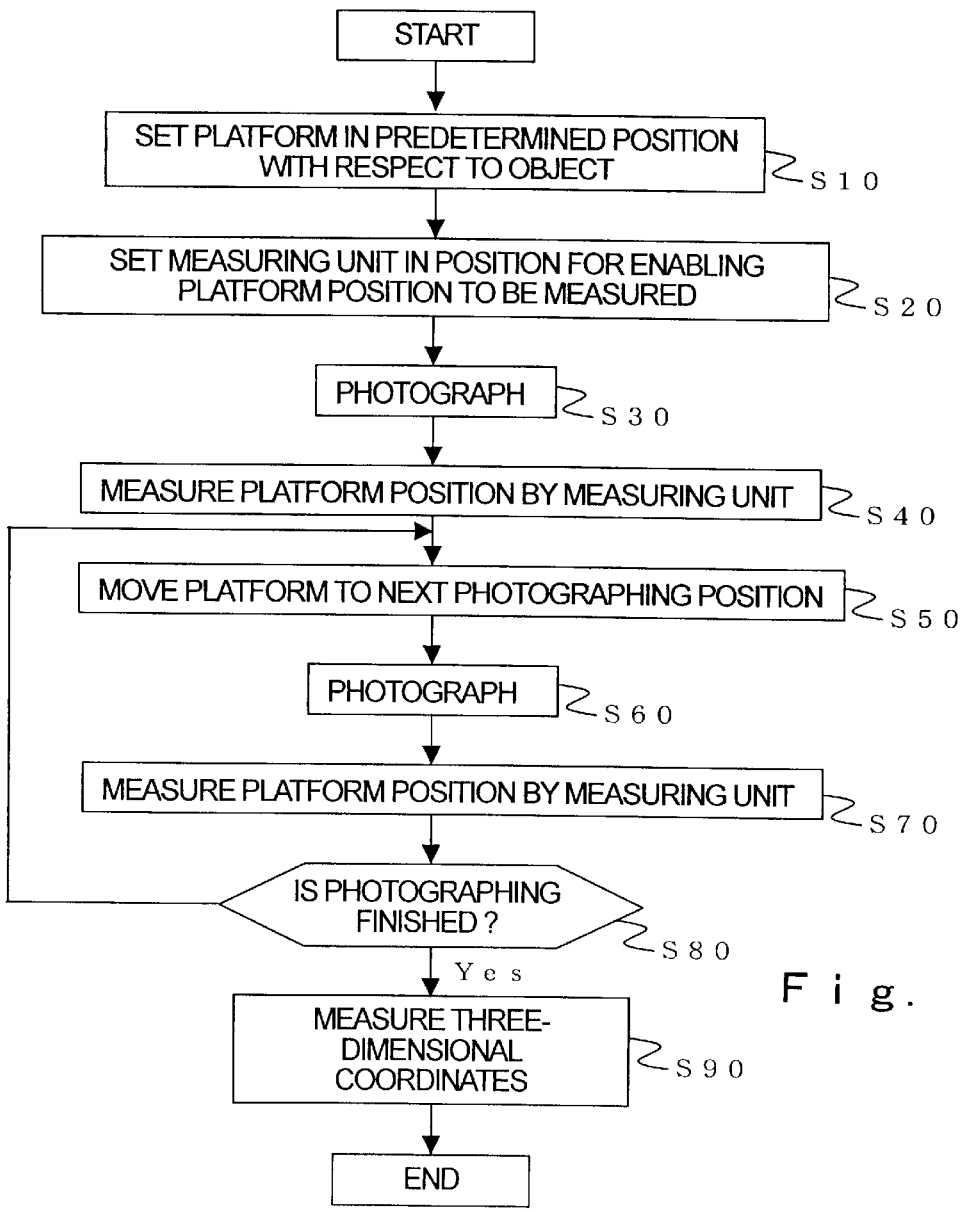
FIG. 18 is a flowchart of basic manual measurement.

Next, the operation of manual measurement will be described by referring to a flowchart. FIG. 18 is a flowchart of basic manual measurement.

First, for example as shown in FIG. 4, the photographing unit 10 is placed in a predetermined position with respect to an object 5 to be measured (S10). This position is roughly decided beforehand based on necessary accuracy and various conditions (lens, pixel size and so on) of a photographing camera. The measuring unit 100 is installed in a position where the omni-directional prism 2 of the photographing unit 10 can be collimated (S20). In this case, since the photographing unit 10 is moved to a plurality of positions (two or more), the prism 2 can be collimated at these positions. For example, in FIG. 4, these are the positions of the photographing unit 10 and 10'. Then, photographing is carried out by pressing a shutter (S30). At this time, in accordance with photographing at the photographing unit 10, the signal generating unit 20 generates a timing signal indicating a photographing timing. The position of the photographing unit 10 is measured by the measuring unit 100 in accordance with the timing signal from the signal generating unit 20 (S40). Then, the photographing unit 10 is moved to a next photographing position (Ss0). Here, as shown in FIG. 4, the next photographing position is assumed to be the position of the photographing unit 10', where a photographing image overlaps the photographing image at the position 10 for enabling stereo-photographing. After the movement of the platform, photographing is carried out (S60). At this time, the signal generating unit 20 generates a timing signal indicating a photographing timing. The position of the photographing unit 10' is measured by the measuring unit 100 in accordance with the timing signal from the signal generating unit 20 (S70). For further photographing, the photographing unit 10 is moved to a next photographing position (S80). Processes thereafter are similar to those of steps S50 to S80.

When the photographing is finished, the photographed image data and the photographing position data are transferred to the signal processing unit 200. The signal processing unit 200 performs three-dimensional coordinates measurement based on these data (S90). At the three-dimensional coordinates measurement, accurate calculation can be made if the camera is set in the ideal state of facing direction and attitude. If not in the ideal state, photographing position data regarding the image is set equal to an initial value at the time of orientation and, by using this data, analysis thereafter will be carried out in a stable manner.

The detailed flowchart of the position measurement of the photographing unit 10 carried out in steps S40 and S70 of the foregoing flowchart of the basic measurement is similar to that of FIG. 7. That is, when the photographing is carried out in step S30 or S60 of FIG. 5, a timing signal is sent from the platform side to the measuring unit 100 in matching with the photographing timing (S41). Then, the position of the photographing unit 10 is measured by the measuring unit 100 (S45). That is, upon having received a command signal of the position measurement, the measuring unit 100 performs position measurement by automatically collimating the omni-directional prism 2 of the photographing unit 10. After the execution of the position measurement, the measuring unit 100 sends measured position data to the platform side (S46). The image data storing unit 30 receives the measured position data, and stores the same in correlation with the photographed image data (S48).

Figure 19:
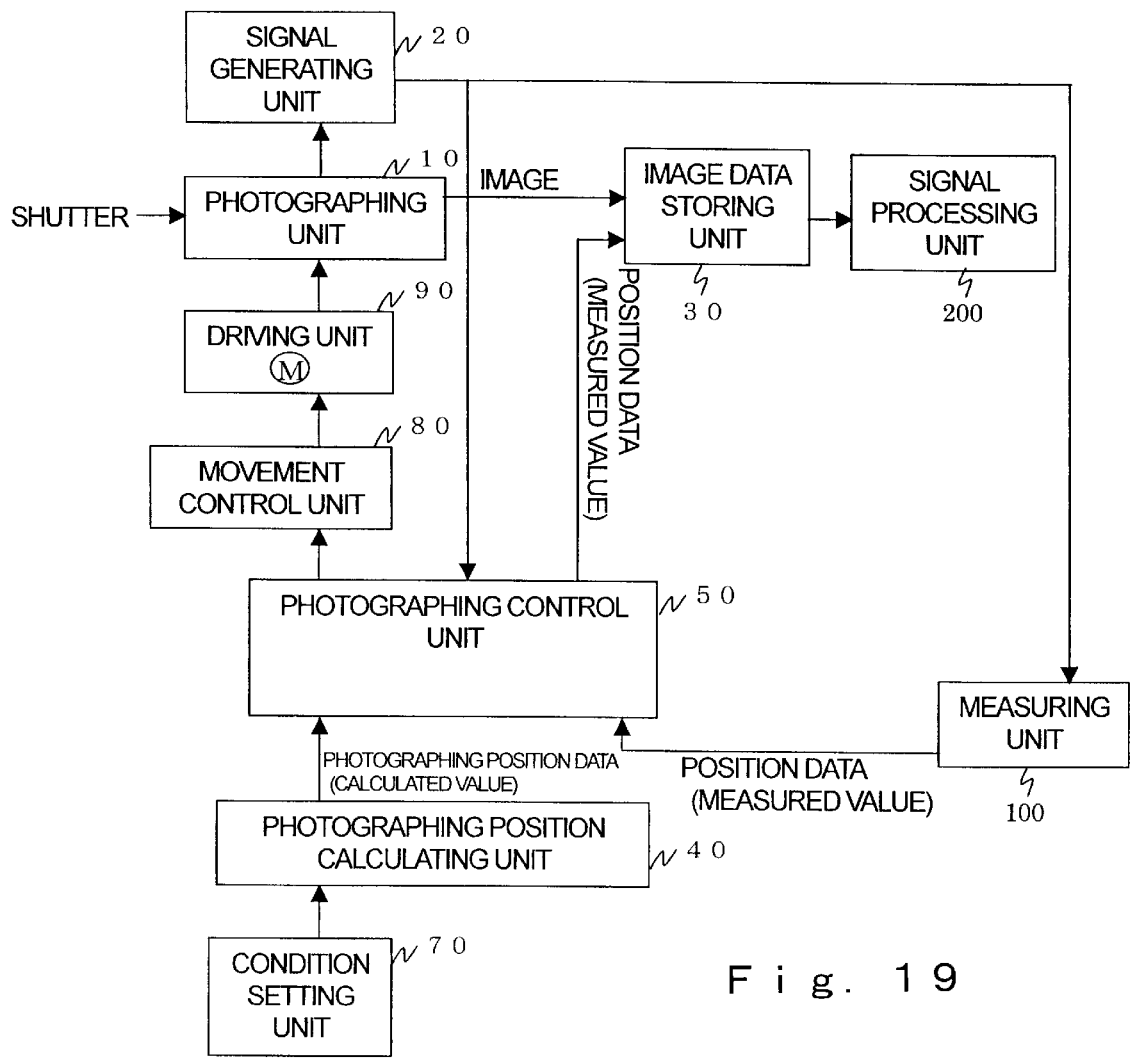
FIG. 19 is an entire configuration view of a fourth embodiment for manual measurement.

FIG. 19 is a constitutional view of a stereo image photographing system according to a fourth embodiment. In the fourth embodiment, the stereo image photographing system comprises: a photographing unit 10; a signal generating unit 20; an image data storing unit 30; a signal processing unit 200; a measuring unit 100; a condition setting unit 70; a photographing position calculating unit 40; a photographing control unit 50; a movement control unit 80; and a driving unit 90.

The signal generating unit 20 sends a timing signal to the measuring unit 100 and the photographing control unit 50 in accordance with a photographing timing at the photographing unit 10. The condition setting unit 70 sets a photographing range, accuracy, a camera standardized value (forcal length, pricipal point, etc.) and other photographing conditions. The photographing position calculating unit 40 calculates a proper photographing position based on the photographing range, the necessary accuracy and the photographing conditions of the camera/lens or the like set by the condition setting unit 70. In addition, the photographing position calculating unit 40 calculates and decides a photographing scheduled position based on the result of preliminary measurement by the measuring unit 100. In order to bring position data (measured value) indicating the position of the photographing unit 10 measured by the measuring unit 100 into coincidence or rough coincidence with the photographing position data calculated by the photographing position calculating unit 40, the photographing control unit 50 allows the movement control unit 80 and the driving unit 90 to move the photographing unit 10. Then, when the coincidence or rough coincidence is set between the measured position data and the calculated photographing position data, audible or visible displaying is executed for an operator of the photographing unit 10. The audible or visible displaying can be carried out by, for example, a proper display device on the platform having the photographing control unit 50, the photographing unit 10 or the like mounted thereon. In addition, the photographing control unit 50 receives the timing signal from the signal generating unit 20 at the photographing timing, and thereby supplies the position data (measured value) to the image data storing unit 30. Also, in this case, the photographed image data received from the photographing unit 10 is stored in the image data storing unit 30. The movement control unit 80 sends the moving amount of the photographing unit 10 to the driving unit 90. The driving unit 90 enables the photographing unit 10 to move. Other components are similar to those of FIG. 1.

The manual operation of semi-automatic measurement can be described by referring to the flowchart shown in FIG. 5.

For example, a difference between the automatic and manual operations is that the automatic photographing is carried out by the photographing unit in the case of the automatic operation, while the operator presses the shutter to execute photographing in the case of the manual operation.

For example, if the photographing position is OK in step S140 or S170, the operator operates the shutter and performs photographing by use of the photographing unit 10 (S180). There may be a case where, as shown in the flowchart of the semi-automatic measurement of FIG. 5, the measured position data of the platform (photographing unit 10) is previously compared with the photographing position data calculated by the photographing position calculating unit 40 by the photographing control unit 50 (S140, and S170). In such a case, the photographing control unit 50 displays the position data and the photographing position data, and if both are determined to be in coincidence or rough coincidence with each other, may display the coincidence or rough coincidence. The detailed flowchart of the position measurement of the photographing unit 10 carried out in steps S110 and S160 in the flowchart of the semi-automatic measurement of FIG. 5 is similar to that of FIG. 7.

3. Basic Principle of Three-dimensional Measurement

Figure 9:
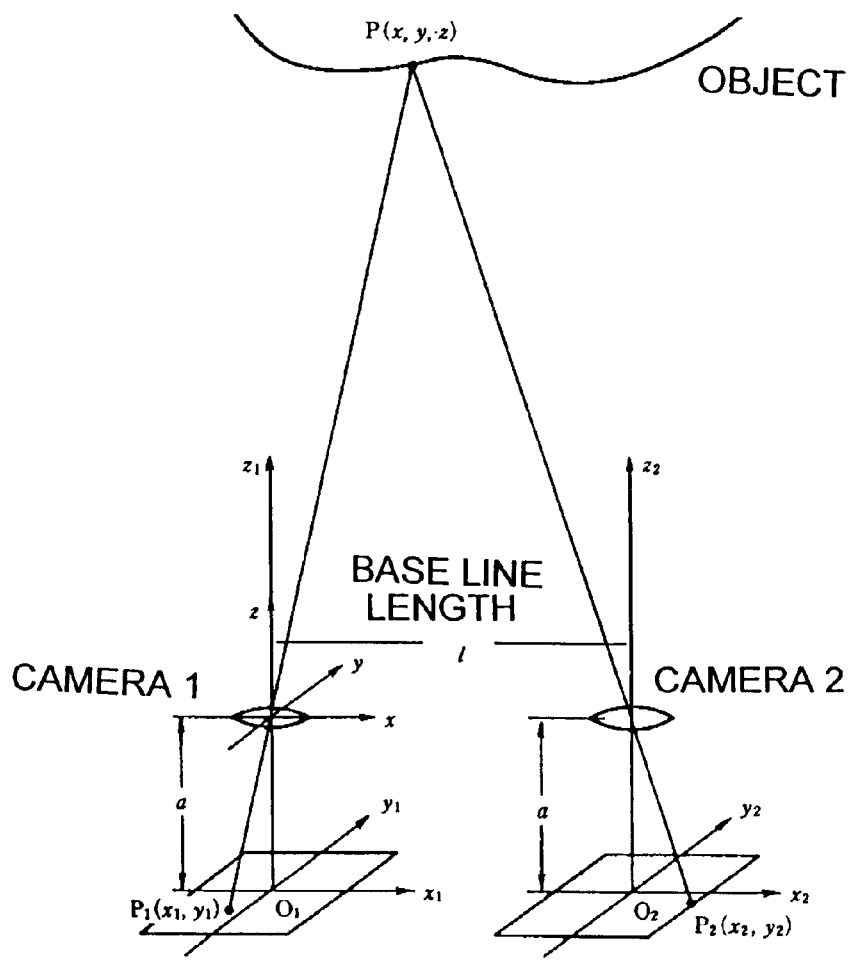
FIG. 9 is a view illustrating a stereo method.

Now, the basic principle of three-dimensional measurement by a stereo method will be described. FIG. 9 is a view illustrating the stereo method. Here, for simplicity, two identical CCD cameras are used. The optical axes thereof are parallel to each other, and distances a from the principal points of camera lenses to CCD surfaces are equal to each other. Further, each CCD is placed perpendicularly to the optical axis. Next, the principle of the stereo method is explained by using these conditions.

A distance (base line length) between two optical axes is set as L. There is a relation described below between the coordinates of points $P_1$ $(x_1, y_1)$ and $P_2$ $(x_2, y_2)$ on an object:

$$x_1 = ax/z \quad (1)$$

$$y_1 = y_2 = ay/z \quad (2)$$

$$x_2 - x_1 = a \times L/z \quad (3)$$

However, the original point of the entire coordinate system (x, y, z) is set at the lens principal point of the camera 1. Z is obtained from the equation (3). Based on this result, x and y are obtained from the equations (1) and (2).

For stereo photographing, photographing must be carried out such that a stereo model can be formed by two obtained images (overlapped images). For further improving measuring accuracy, photographing must be performed under a proper condition as much as possible. Therefore, a photographing attitude position correcting unit 6 can be provided on the camera 1 of the photographing unit 10. The correcting unit 6 enables the camera 1 on the photographing unit 10 to be controlled in the three axial directions of x, y and z, and to be moved up and down, and also a lens magnification to be varied.

4. Correction

Figure 10:
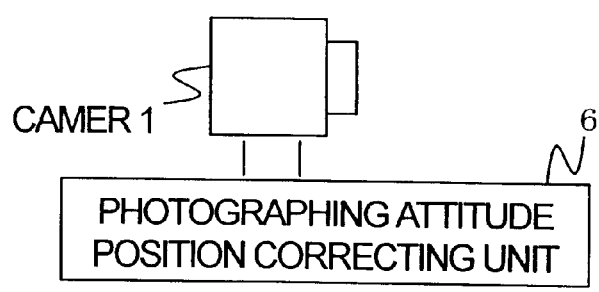
FIG. 10 is a constitutional view of a camera of the photographing unit.

FIG. 10 is a constitutional view of a photographing unit having a photographing attitude position correcting unit. In this constitution, a camera 1 and a photographing attitude position correcting unit 6 are provided.

The photographing attitude position correcting unit 6 measures the attitude and the facing direction of the camera 1 with a sensor (gyro or the like), and corrects the attitude and facing direction thereof. As a result, measurement considerably high in reliability can be carried out based on the data at the photographing position maintained to facilitate stereo measurement with respect to the object to be measured. Alternatively, if the position and the facing direction of the camera 1 are measured by such a sensor and corrected by the signal processing unit 200, automatic three-dimensional measurement can be performed. Further, the photographing attitude position correcting unit 6 includes a sensor portion for measuring angles in three axial directions (azimuth and inclination angle) and a movable portion variable in three axes and upper/lower directions, and can control the magnification of the camera lens.

The measurement of angles in the three axial directions is carried out by using various attitude sensors including a clinometer, a direction meter and the like. Alternatively, the angles in the three axial directions may be corrected by placing the camera 1 of the photographing unit 10 on a leveling base. For the correction in the vertical directions and the magnification, the above sensors, GPS500 or the like can be used. However, by using the measured value of the measuring unit 100, more accurate correction can be performed.

Figure 11:
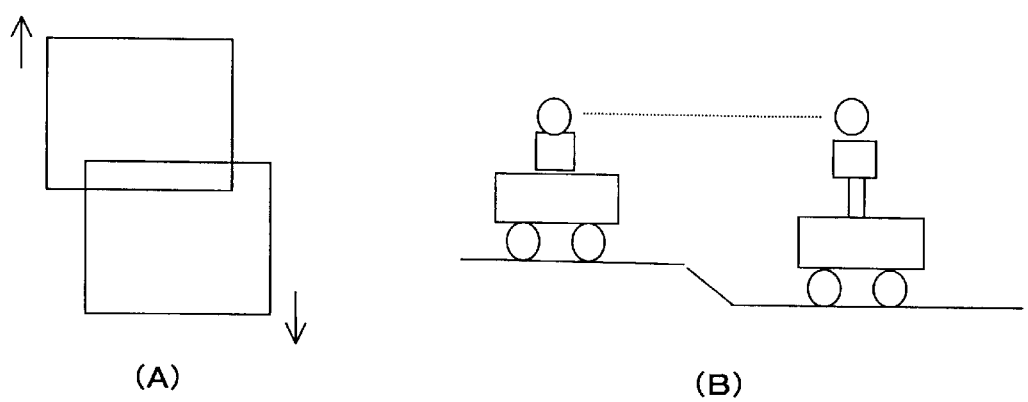
FIGS. 11A and 11B are views, each of them illustrating vertical direction correction.

More description will be made below. FIGS. 11A and 11B are views illustrating the correction in the upper/lower directions. As shown in FIG. 11A, when there is a level difference between two photographing positions, the photographing ranges are different from each other in the upper/lower directions to form an image unsuitable for measurement. The level difference can be identified when the position of the photographing unit 10 is measured by the measuring unit 100. The photographing attitude position correcting unit 6 moves the camera 1 of the photographing unit 10 up and down based on such three-dimensional data to a proper height as shown in FIG. 11B.

Figure 12:
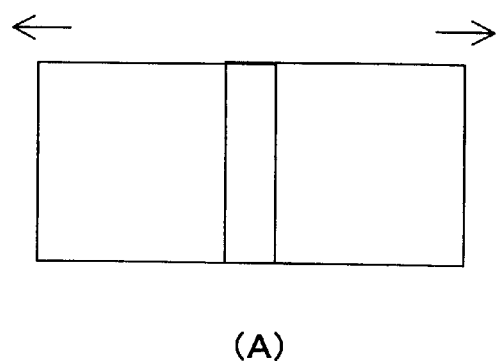
FIGS. 12A and 12B are views, each of them illustrating left/right direction correction.
Figure 12:
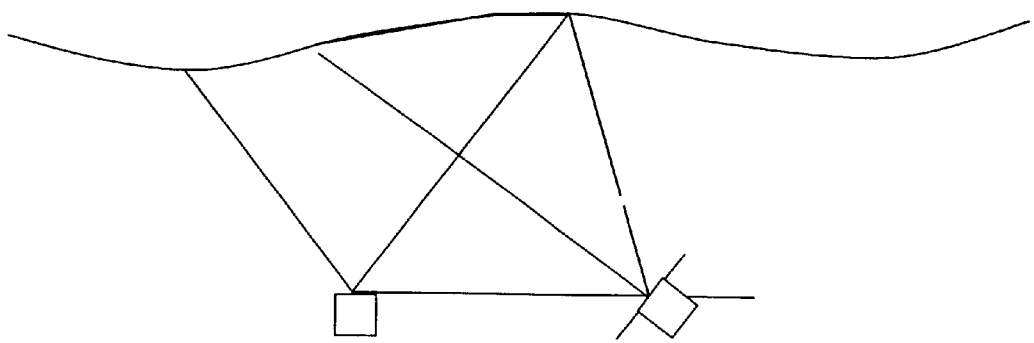

FIGS. 12A and 12B are views illustrating the correction in the horizontal (left and right) direction. As shown in FIG. 12A, an overlapped portion is reduced as movement is made more in a horizontal direction. It is only necessary to control the photographing unit 10 into a predetermined position. However, if the photographing unit 10 cannot be moved to a proper position for one reason or another, photographing is carried out by directing the camera 1 toward a predetermined measuring range (FIG. 12B). Since the azimuth of the photographing unit 10 can be known by the gyro of the photographing attitude position correcting unit 6, based on this azimuth and the photographing position measured by the measuring unit 100, a proper direction is calculated, and the camera 1 of the photographing unit 10 is directed in the calculated proper direction.

Figure 13:
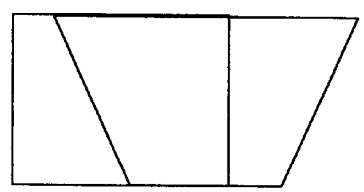
FIGS. 13A to 13C are views, each of them illustrating swinging direction (inclination) correction.
Figure 13:
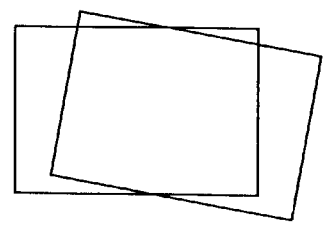
Figure 13:
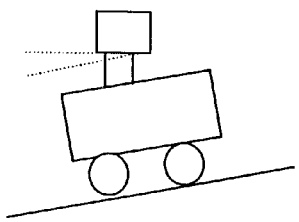

FIGS. 13A to 13C are views illustrating the correction in a swinging direction (inclination). If inclination occurs in the upper/lower direction or the left/right direction with respect to an advancing direction, a photographed image becomes one shown in each of FIGS. 13A and 13B.

In the case of the inclination in the upper/lower direction, for example, the photographing unit 10 is set in a state like that shown in FIG. 13C.

To prevent the foregoing, by the clinometer for the upper/lower and left/right direction of the photographing attitude position correcting unit 6, the inclining amount of the camera 1 is measured and corrected, and then photographing is executed.

Figure 14:
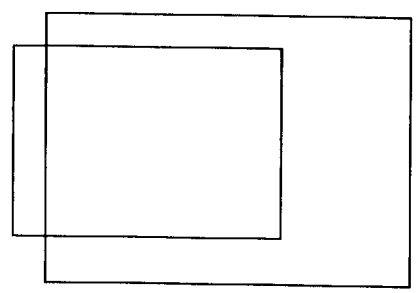
FIGS. 14A and 14B are views, each of them illustrating magnification correction.
Figure 14:
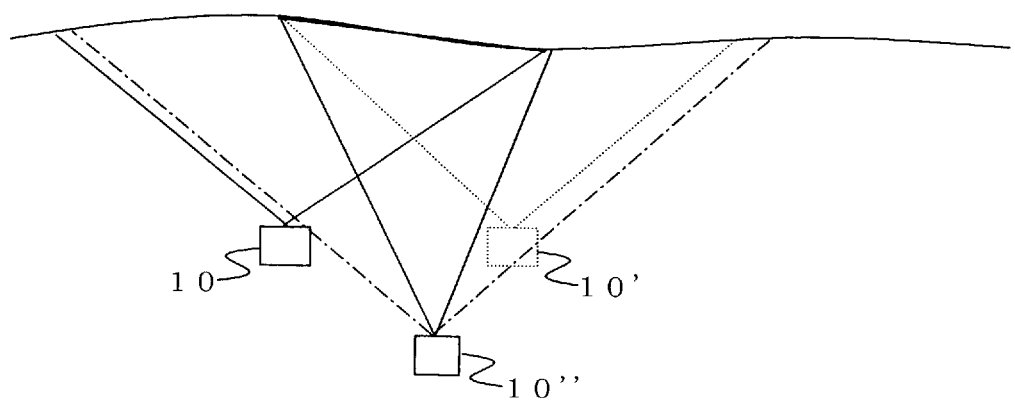

FIGS. 14A and 14B are views illustrating the correction of a magnification. As shown in FIG. 14A, if two images are different from each other in magnification, then a failure occurs. For example, when two images must be photographed at the positions of the photographing units 10 and 10' in FIG. 14B, the second image cannot be photographed at the position of the photographing unit 10' for one reason or another, and may come to be photographed at the position of the photographing unit 10" or the like. In such a case, since a distance from the photographing unit 10 to the object to be measured is known by the measuring unit 100, the photographing attitude position correcting unit 6 adjusts the magnification of the lens of the camera 1. Thus, the difference of the two images in magnification is corrected, a proper measuring range is set, and then photographing is executed.

Thus, by providing the photographing attitude position correcting unit 6 in the camera 1 of the photographing unit 10, and using various attitude sensors and the measured value of the measuring unit, a suitable photographing condition can be set for stereo photographing.

5. Obstacle Detection

Next, obstacle detection will be described. If there is an obstacle in the photographing position for a range to be measured, by using a reflectorless total station (TS) for the measuring unit 100, the following process is employed to avoid the obstacle and then photographing is executed.

Figure 15:
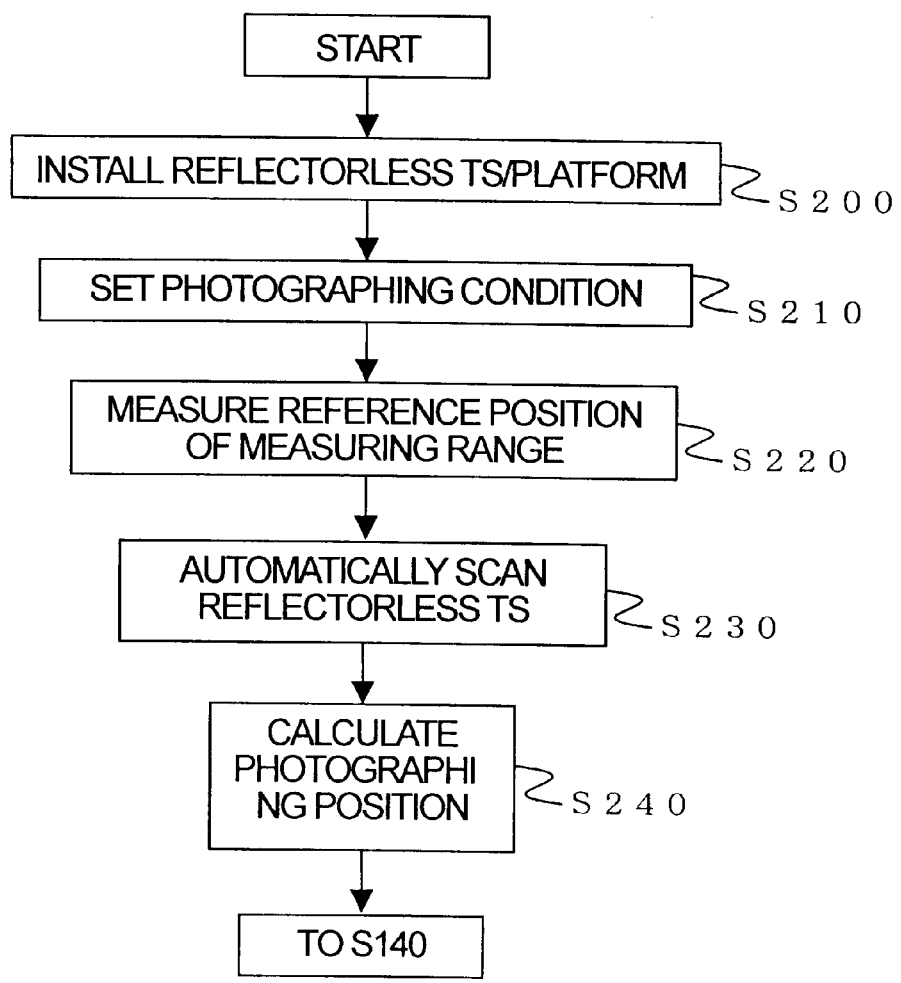
FIG. 15 is a flowchart of obstacle detection.
Figure 16:
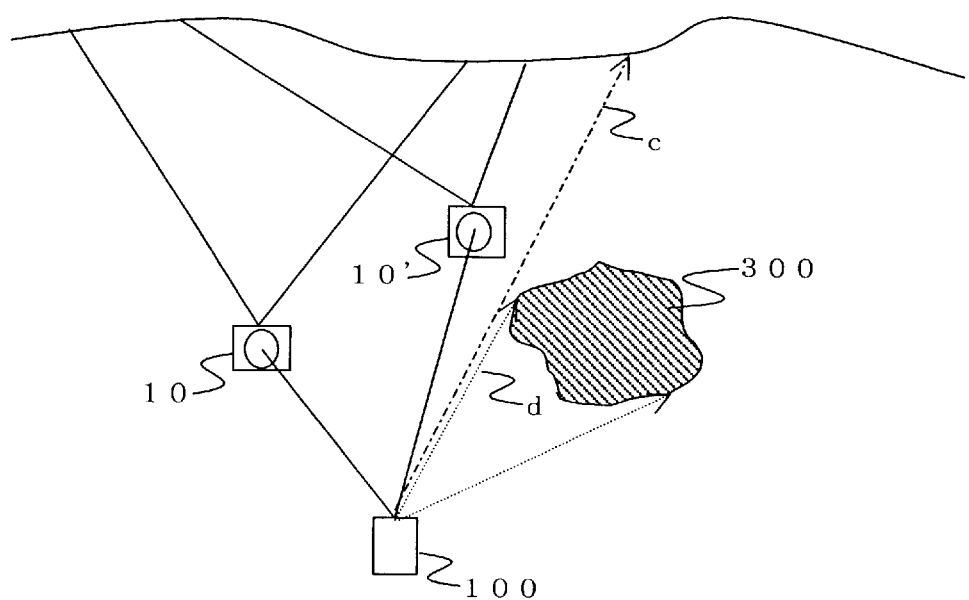
FIG. 16 is a view illustrating measurement at the time of obstacle detection.

FIG. 15 is a measurement flowchart for obstacle detection. FIG. 16 is a view illustrating obstacle detection. This obstacle detection processing can be properly executed before automatic measurement processing or on the midway thereof. Description will be made by referring to the flowchart of FIG. 15.

First, the measuring unit 100 and the platform (photographing unit 10) are set in proper positions (S200). A photographing condition is set by the condition setting unit 70 (S210). At this time, other than the photographing parameters set in step S110 of FIG. 5, measuring target ranges a and b (see FIG. 6) are roughly entered. The reference position of the measuring range is measured by the reflectorless TS (S220). If the measuring target ranges a and b have been entered, the reference position of the measuring range may be one of starting and end points or both. Here, to further assure measurement, the position of the photographing unit 10 is also measured. However, if there are no reflection obstacles equal in size to a prism in the measuring target range, the position of the photographing unit 10 may be measured by automatic scanning of next step S230. The position of the photographing unit 10 is detected by the omni-directional prism 2 at a place where the quantity of received light of the reflectorless TS is largest. However, by measuring the position of the platform (photographing unit 10) or the like in this case, work time (scanning detection time) can be shortened. Then, the reflectorless TS is subjected to automatic scanning in the measuring range (S230). At this time, the position of the obstacle (region 300 of FIG. 16) is automatically detected. The obstacle detection can be made by a point where a measured distance value by the reflectorless TS is largely discontinuous (lines c and d of FIG. 16) and continuity of the distance thereof. Then, a photographing position is calculated based on the photographing condition and the reference position of the measuring range (S240). After the calculation of the photographing position, calculation is made as to overlapping of the photographing position with the obstacle detection range, and as to the presence of an obstacle in a scheduled movement route. If the photographing position is overlapped with the obstacle, an equivalent photographing position is decided based on a photographing enabling position and a lens magnification (e.g., position of the photographing unit 10' in FIG. 16). An adjustment of magnification is made to be in a wide angle side when approaching the object; to be in a telescope side when moving away from the object. If not adjusted sufficiently, the angle of the camera 1 in a horizontal direction is calculated, and as shown in FIG. 12B, the camera 1 is rotated in a horizontal direction. If the obstacle is present in the photographing position movement route, a portion between the obstacle and the measuring unit 100 is set as a prevention route, and the camera is moved. Processes thereafter are similar to those from step S140 of the automatic measurement flowchart in FIG. 5.

What is claimed is:

1. A stereo image photographing system comprising:
   a photographing unit which is movable and has a camera for photographing and a reflection member placed thereon;
   a signal generating unit for generating a timing signal indicating a photographing timing when photographing is made by the camera of said photographing unit; and
   a measuring unit placed in a position apart from said photographing unit, for emitting a measuring light toward the reflection member of said photographing unit in accordance with the timing signal from said signal generating unit, and measuring positions of said photographing unit based on a reflected light reflected from the reflection member,
   wherein the system determines a base line length of photographing points based on the measured positions of said photographing unit, obtains photographed data by said photographing unit and obtains three-dimensional coordinates of an object photographed based on the base line length and the photographed data.

2. The stereo image photographing system according to claim 1,
   wherein the camera of said photographing unit performs stereo-photographing at least at two places, and said measuring unit measures positions of at least the two photographing places.

3. The stereo image photographing system according to claim 1,
   wherein said measuring unit sends position data regarding the measured photographing positions to said photographing unit side.

4. The stereo image photographing unit according to claim 1, further comprising: an image storing unit for storing data of the positions measured by said measuring unit and data of the photographed image photographed by the camera of said photographing unit in correlation with each other.

5. The stereo image photographing system according to claim 1, further comprising: a signal processing unit for obtaining three-dimensional coordinates of an object to be photographed based on the data of the positions measured by said measuring unit and data of the photographed image photographed by the camera of said photographing unit.

6. The stereo image photographing system according to claim 1, further comprising: a driving unit for moving said photographing unit; and a movement control unit for controlling said driving unit.

7. The stereo image photographing unit according to claim 1, further comprising: a photographing control unit for performing control for movement of said photographing unit based on data of the position of said photographing unit measured by said measuring unit and data of a photographing position calculated based on photographing condition data regarding an object to be photographed.

8. The stereo image photographing system according to claim 1, further comprising: a photographing control unit for storing data of the position measured by said measuring unit and data of an image photographed by said photographing unit in accordance with the timing signal from said signal generating unit.

9. The stereo image photographing system according to claim 1, further comprising: a photographing control unit for displaying one of coincidence and approximate coincidence between position data regarding the position of said photographing unit measured by said measuring unit and photographing position data calculated by a photographing position calculating unit.

10. The stereo image photographing system according to claim 1,
    wherein at least said photographing unit is mounted on a platform for photographing, and further comprising: a transmitter/receiver for transmitting data between the platform and said measuring unit.

11. A stereo image photographing system comprising:
    a photographing unit which is movable and has a camera for photographing an image of an object in accordance with a timing signal indicating a timing and a reflection member placed thereon;
    a measuring unit placed in a position apart from said photographing unit, for emitting a measuring light toward the reflection member of said photographing unit, and measuring a position of said photographing unit based on a reflected light reflected from the reflection member;
    a photographing position calculating unit for calculating photographing position data based on photographing condition data regarding the object to be photographed;
    a driving unit for moving said photographing unit to a predetermined position based on the photographing position data calculated by said photographing position calculating unit;
    a movement control unit for controlling said driving unit; and
    a photographing control unit for outputting the timing signal to the camera of said photographing unit when any one of coincidence and approximate coincidence is determined between position data regarding the position of said photographing unit measured by said measuring unit and the photographing position data calculated by said photographing position calculating unit,
    wherein the system determines a base line length of photographing points based on the measured positions of said photographing unit, obtains photographed data by said photographing unit and obtains three-dimensional coordinates of an object photographed based on the base line length and the photographed data.

12. The stereo image photographing system according to claim 11,
    wherein the camera of said photographing unit performs stereo-photographing at least at two places and said measuring unit measures positions of at least the two photographing places.

13. The stereo image photographing system according to claim 11, further comprising: a position correcting unit for enabling the camera of said photographing unit to change a photographing condition regarding at least one of a facing direction, a height and a magnification in order to maintain a condition suitable for stereo-photographing in accordance with movement of said driving unit.

14. The stereo image photographing system according to claim 11,
    wherein the camera of said photographing unit can adjust a facing direction in the upper and lower direction thereof as a photographing condition in order to maintain a condition suitable for stereo-photographing in accordance with a height of movement of said driving unit.

15. The stereo image photographing system according to claim 11,
    wherein the camera of said photographing unit can adjust a facing direction in the horizontal direction thereof as a photographing condition in order to maintain a condition suitable for stereo-photographing in accordance with a distance of the movement of said driving unit.

16. The stereo image photographing system according to claim 11,
wherein the camera of said photographing unit can adjust a facing direction in a swinging direction thereof as a photographing condition in order to maintain a condition suitable for stereo-photographing in accordance with inclination of said photographing unit during the movement of said driving unit.

17. The stereo image photographing system according to claim 11,
wherein the camera of said photographing unit can adjust a magnification thereof as a photographing condition in order to maintain a condition suitable for stereo-photographing according to a distance from the object to be photographed to the camera.

18. The stereo image photographing system according to claim 11,
wherein said measuring unit performs preliminary measurement for detecting an obstacle in a photographing target range and near the photographing position and, based on a result of the preliminary measurement, said photographing position calculating unit calculates and decides a photographing scheduled position.

19. The stereo image photographing system according to claim 11,
wherein said measuring unit sends the position data of the measured photographing position to said photographing unit.

20. The stereo image photographing system according to claim 11, further comprising: an image storing unit for storing the data of the position measured by said measuring unit and data of the photographed image photographed by the camera of said photographing unit in correlation with each other.

21. The stereo image photographing system according to claim 11,
wherein at least said photographing unit, said driving unit and said movement control unit are mounted on a platform for photographing, and further comprising: a transmitter/receiver for transmitting data between the platform and said measuring unit.

22. A stereo image photographing system comprising:
a photographing unit which is movable and has a camera for photographing and a reflection member placed thereon;
a photographing position calculating unit for calculating photographing position data based on photographing condition data regarding an object to be photographed;
a driving unit for moving said photographing unit to a predetermined position based on the photographing position data calculated by said photographing position calculating unit;
a movement control unit for controlling said driving unit; and
a storing unit for storing data of an image photographed by the camera of said photographing unit,
wherein the system determines a base line length of photographing points based on the measured positions of said photographing unit, obtains photographed data by said photographing unit and obtains three-dimensional coordinates of an object photographed based on the base line length and the photographed data.

23. The stereo image photographing system according to claim 22, wherein the camera of said photographing unit performs stereo-photographing at least at two places, and positions of at least the two photographing places are measured.

24. The stereo image photographing system according to claim 22, further comprising: a position correcting unit for enabling the camera of said photographing unit to change a photographing condition regarding at least one of a facing direction, a height and a magnification in order to maintain a condition suitable for stereo-photographing in accordance with movement of said driving unit.

25. The stereo image photographing system according to claim 22,
wherein the camera of said photographing unit can adjust a facing direction in the upper and lower direction thereof as a photographing condition in order to maintain a condition suitable for stereo-photographing in accordance with a height of movement of said driving unit.

26. The stereo image photographing system according to claim 22,
wherein the camera of said photographing unit can adjust a facing direction in the horizontal direction thereof as a photographing condition in order to maintain a condition suitable for stereo-photographing in accordance with a distance of movement of said driving unit.

27. The stereo photographing system according to claim 22,
wherein the camera of said photographing unit can adjust an angle in a swinging direction thereof as a photographing condition in order to maintain a condition suitable for stereo-photographing in accordance with inclination of said photographing unit during the movement of said driving unit.

28. The stereo photographing system according to claim 22,
wherein the camera of said photographing unit can adjust a magnification thereof as a photographing condition in order to maintain a condition suitable for stereo-photographing in accordance with a distance between the object to be photographed and the camera.

29. A stereo photographing system according to claim 22,
wherein an external measuring device performs preliminary measurement for detecting an obstacle in a photographing target range and near the photographing position and, based on a result of the preliminary measurement, said photographing position calculating unit calculates and decides a photographing scheduled position.

30. The stereo image photographing system according to claim 22, further comprising: a measuring unit for measuring at least one of position data and attitude data of said photographing unit at the time of photographing.

31. The stereo image photographing system according to claim 22, further comprising: an image storing unit for storing the position data measured by one of said measuring unit and said external measuring device and the data of the image photographed by the camera of said photographing unit in correlation with each other.

32. The stereo image photographing system according to claim 22, further comprising: a photographing control unit for performing control for movement of said photographing unit based on the position data of said photographing unit measured by one of said measuring unit and said external measuring device and data of the photographing position calculated based on the photographing condition data regarding the object to be photographed.

33. The stereo image photographing system according to claim 22, further comprising: a photographing control unit for storing the data of the position measured by one of said measuring unit and said external measuring device, and the data of the image photographed by said photographing unit in accordance with a timing signal from said signal generating unit.

* * * * *